United States Patent Office 2,745,756
Patented May 15, 1956

---

2,745,756

PREPARATION FOR STORAGE OF SOLID ANIMAL PROTEINACEOUS MATERIALS

Frederic S. Ruff, Cambridge, Mass., assignor to
F. William Andres, Boston, Mass., trustee No Drawing. Application May 23, 1951,
Serial No. 227,933

1 Claim. (Cl. 99—187)

This invention relates to the preservation and storage of perishable foodstuffs and the like. It is concerned particularly with the preparation for storage of solid proteinaceous materials derived from animal tissues or fluids, such as meats, bacon, sausage, kidneys, fish products, and dairy products, such as cheese, butter, etc., whether they are utilized for nutritive or biological purposes.

It is the primary object of this invention to provide an improved commercial method for packaging such materials in a manner permitting prolonged storage with less deterioration, less texture and color change, and, in the case of foodstuffs, with less flavor loss.

While frozen food products have received wide acceptance, present processes are not universally applicable to all food products; they are subject to certain well-recognized limitations. For example, cheese and bacon are not available in frozen form. Many of the products which are available undergo such changes that precautions in cooking are recommended. For example, with steaks and other meat and shellfish products, the packers specifically recommend that the products be cooked without previous defrosting, or with only partial defrosting sufficient to separate units. Essential juices are lost with complete defrosting. When the meat is defrosted as it cooks, these essential juices are released with moisture in the same manner as they would be if the products were completely defrosted before cooking. The result is that the cooking has the aspect of a stewing rather than of a frying or a broiling. These characteristics may be understood from the standpoint of the history of food freezing, it being remembered that the pioneering Birdseye process was based on a "sharp" freezing method as a means for minimizing cell rupture attendant to expansion of the moisture and other liquid content of the cells during freezing. While commercial sharp or quick freezing has been recognized as an aid to prevention of cell rupture, it is not an assurance against cell rupture as is evident from the "drip" which accompanies thawing, particularly in meat and fish products.

Stewed meats do not have the flavor characteristics of fried or broiled meats.

Again, commercial packers recommend cooking from the frozen state to avoid the deterioration which ensues in these products after defrosting. They are unwilling to trust the housewife or other consumer with respect to safe length of storage after thawing but before use. They recognize that the frozen products do not have the storage life of fresh products at domestic refrigerator temperatures (34–40° F.). These recommendations thus stem from a recognition by the packers that the freezing and thawing processes deprive the fresh product of its normal storage life, which is the consumer's ingrained measure of safe storage periods. These physical changes and shorter storage life are also responsible for the thoroughly advertised precaution against re-freezing or re-use after inadvertent re-freezing.

Products packed in accordance with this invention, as far as can be determined by tests so far conducted, have a storage life after defrosting in the sealed package, not only equivalent to, but in all cases so far observed, longer than their normal fresh storage life at domestic refrigerating or retail display case temperatures. It is thus a further object of this invention to provide packaged products which may be displayed for longer periods after opening or used piecemeal by the consumer, as in the case of fresh products, thus avoiding waste, and relieving the packer from providing individual serving packs, thus affording economies from the standpoint of both the packer and the consumer.

As in the case of previous frozen foodstuffs, this invention relies upon low temperatures to inhibit enzymatic and bacteriological activity and thus prevent spoilage while frozen, but the low temperatures are achieved and maintained only after the products have been specially conditioned for low temperature treatment and storing. Exceedingly remarkable results have been attained from the instantaneous application of high vacuum to solid proteinaceous comestibles followed by application of temperatures well below the freezing point of water to the materials in the vacuumized state.

Application of high degrees of vacuum to roasted food products is not unknown. Its purpose, in the case of nuts and coffee, is to remove oxygen and thereby avoid oxidation reactions of the kind which are particularly troublesome when these products are packed in accordance with conventional low vacuum canning practice. Such reactions cause flavor losses and rancidity. Low vacuum packs leave oxygen residues more than adequate to sustain oxidation. As is known, special cans of thicker gauge metal are required for use in the application of the high vacuum technique. Normal tins cannot be safely relied upon to withstand these degrees of vacuum without collapse in handling and transportation.

The high vacuum pack has rendered such roasted products more acceptable without other treatment. It should be noted, however, that the high temperature roasting treatments have destroyed the natural structure and reduced the cell moisture content, before the vacuum is applied.

As distinguished from such roasted products, this invention deals with the packaging of proteinaceous solids which still have substantially their natural cell structure and comprises the application to such materials of a normal freezing procedure after the materials have been placed in rigid cans or other suitable high vacuum containers of greater internal volume than the volume of the pack and subjected substantially instantaneously to high vacuum as hereinafter described, and sealed in the vacuumized state. In most cases, the products are such that, at the time of packing, they have not only their natural cell structure, but also retain substantially their natural moisture content. The freezing procedure may be either the normal quick freezing or may be a slow freeze, so far as tests heretofore conducted reveal, to temperatures below 15° F., i. e. 0° F. or lower.

The benefits that are derived include the double inhibition of aerobic bacteria activity by the high vacuum and of anaerobic bacteria activity and enzyme activity by the application of the lower temperature. But these are not the most important benefits. Rather, in accordance with this invention, freezing under high vacuum is accomplished in some manner, still being investigated, which, in the case of products having their natural cell structure, has less effect on the cell and/or cell wall than freezing at normal atmospheric pressure. Without intending to be bound by present theory, the results may be explained upon the basis of a removal of gases from within the individual cells by the application of the high vacuum. If there be such gas removal, it is reasonable to suppose that the cell, being relieved of a part of its normal volume of contents, may well shrink to such a degree that when low temperature is subsequently supplied, the cell wall has sufficient looseness or other expansive capacity that it can accommodate, in the absence of the removed gases, the increasing volume of the expanding liquid contents as they freeze, without moisture-freeing damage to the wall structure. Where the products are defrosted before the container is opened, the storage life at domestic refrigerator or retail display case temperature is increased at least 100%, the products often remaining edible and appetizing in appearance from eight to ten days instead of two to four days. This can be attributed, in part at least, to the relatively slow re-absorption of gases, i. e. air, by the cells after their exposure to atmospheric pressure and, therefore, a delayed activity of aerobic bacteria. Thawing in the sealed package brings the cells to room temperature in the absence of air so that an equilibrium of a kind, in any event, has been established before exposure to air.

A last extraordinary advantage, which is believed to be due to the extraction of air from the cells, is a marked tendency for products packaged in accordance with this invention, when cooked frozen or immediately upon thawing, to transmit heat with much more uniformity than fresh products. Thus, bacon, steaks, etc. so packaged may be cooked without turning and yet be found to be cooked uniformly throughout with relatively even heat penetration. Unsealed products may be re-frozen after thawing, if not allowed to stay in the unfrozen state for any great length of time.

Certain other factors which may, in the light of further experimentation, develop to be contributing to these results are low pressure minimizing denaturization of the proteins, and retention of enzymes within the unruptured cell walls in their natural unharmful environment.

The commercial importance of the process and the desirability of enlisting further research funds and manpower dictate the preparation and filing of this application despite the problematical explanation of the remarkable results achieved.

Also, difficulties are encountered in stating exact degrees of high vacuum existing in the containers since, in the use of commercial high vacuum packing machinery, the exact internal pressure after sealing varies to some degree depending upon such variables as the kind and volume of the contents. Nor can it be stated with exactness just how, if at all, storage life is affected by increments of decreasing pressure. Suffice it to say that experience to date is based upon that vacuum which is produced by high vacuum commercial can machinery and which is always above 27.5 inches of Hg and, in most cases, more.

Vacuums produced by this machinery are pulled substantially instantaneously on a No. 1 coffee can, the machines which have been used being well known in the art and which are stated to be capable of sealing No. 1 coffee cans at the rate of at least 100–120 per mniute.

The following are typical examples of the improved procedure:

*Example I.*—Bacon slices in commercially fresh condition, still contained in loose paper wrappers as they came from the packer, were placed in cylindrical coffee cans and passed through coffee can high vacuum packing machinery. The machine was estimated to develop a vacuum of 28.9 inches. The cans were sealed in the machinery at this estimated internal pressure. The sealed cans were then placed in a commercial freezer and held at a temperature of 0° F. for periods of three months and twelve months, respectively. They were then removed and allowed to defrost in sealed condition at room temperature for periods of approximately five hours in each case. When removed, there was no more oiling off or moisture than was present at the time of packing. When some strips of the bacon were cooked, there was no apparent change in flavor or color from a cooked fresh unfrozen product. The remainder of each pack was not cooked but was placed in a market chest with freshly delivered bacon from the same packer and at the end of approximately three weeks in the market chest at a temperature varying between 35 and 40° F., the defrosted samples showed astoundingly less rancidity and decomposition than the fresh samples.

During cooking, the bacon showed the remarkable effect of no appreciable shrivelling—it retained substantially its original strip length and it cooked uniformly throughout without being turned. The fresh bacon shrunk, as usual, to at least 70% of its original uncooked length.

A sample of bacon frozen at atmospheric pressure deteriorates very rapidly, changes in color, does not cook well and becomes rancid very soon after defrosting.

*Example II.*—Four ¼ pound wrapped packages of Philadelphia cream cheese (known to have a very short commercial life) were subjected to the same process as in Example I except that they were held frozen for a period of only four weeks. They were then removed from storage and defrosted in warm water while the can was still sealed. After three hours the cheese was removed and upon removal from their foil wrappings were found to be in every respect comparable in physical appearance and taste to normal Philadelphia cream cheese in its fresh condition. This cheese remained in perfect condition under ordinary household refrigeration for four weeks.

It is well known that cheese during freezing at atmospheric pressure expands so that internally it completely crumbles after thawing and is very different in physical appearance and texture from fresh cheese.

*Example III.*—Four pork chops ⅝" thick were loosely wrapped, but not sealed, in cellophane and processed in the same manner as indicated in Example I. Upon unsealing, after defrosting, the chops showed no discoloration, no wetness and, as far as could be determined, were in the same naturally fresh cut condition as when packed. In storage at 35 to 40° F., the keeping quality was equal to that of fresh samples.

In addition, beefsteak, lamb chops, veal cutlets, beef for stew, lamb for stew, lamb kidneys, sausage, fish and whole chickens have been successfully packed; also, eggs in the shell, each loosely wrapped in cellophane held by Scotch tape. In the case of eggs, the integrity of the yolk is preserved. All previous whole egg frozen processes rupture the yolk so that the white and the yolk blend together, rendering them useless for cooking uses requiring separated whites and yolks. The process hereof does cause a stiffening of the yolk and has a tendency to crack the shells, but the whites remain unchanged.

The process hereof is not applicable to carbohydrates, which have high moisture contents, i. e., of the order of more than 85%, apparently for the reason that the cell gases cannot be removed without simultaneously removing too much moisture; nor is it applicable to any other products, proteinaceous or otherwise, whose solids content, like in carbohydrates, run no higher than 15%. Best results have been obtained with solid animal proteinaceous substances, the moisture contents of which have been in the range of 65–75%. In the case of such products, the instantaneous vacuumizing apparently pulls air almost instantaneously from the cells without permitting loss of moisture. The following freezing operation, preferably performed as soon as possible after the sealing of the container, tends to maintain the moisture in the cell structure throughout storage.

While the examples pertain to specific foodstuffs, it is to be understood that these are merely typical, and that the process is, as described hereinabove, applicable to a variety of similar materials in which cell structure preservation is of importance for reasons of flavor retention, retention of physical appearance, or increased storage life in the defrosted state.

I claim:

The method of packing animal proteinaceous solids for storage in the frozen state, said solids have a solid content of more than 15% and a moisture content of no more than 85%, comprising placing said unfrozen animal proteinaceous solids having substantially their natural cell structure in a rigid sealable container, drawing a vacuum in the container substantially instantaneously to at least 27.5 inches of Hg to remove from all surfaces of said solids substantially all pressure due to atmosphere and to remove gases from said solids to permit expansion of moisture therein, hermetically sealing the soids in such condition in the container at the attenuated pressure, and then removing heat from the sealed container and enclosed solids to bring the same to a temperature for storage not exceeding 15° F. whereby the storage life of the solids after defrosting is greatly increased.

References Cited in the file of this patent

UNITED STATES PATENTS

| | | |
|---|---|---|
| 2,335,738 | Casey | Nov. 30, 1943 |
| 2,364,049 | Bensel | Dec. 5, 1944 |
| 2,376,583 | De Poix | May 22, 1945 |
| 2,398,082 | Cavallito | Apr. 9, 1946 |
| 2,528,832 | Johnson | Nov. 7, 1950 |

OTHER REFERENCES

"Modern Packaging," May 1950, pages 99, 100, and 101, article entitled "Vacuum-Pre-Packaged Meats,"